(12) United States Patent
Bi et al.

(10) Patent No.: US 12,260,094 B2
(45) Date of Patent: Mar. 25, 2025

(54) MEMORY SYSTEM AND METHOD OF OPERATING THEREOF, AND COMPUTER-READABLE STORAGE MEDIUM

(71) Applicant: YANGTZE MEMORY TECHNOLOGIES CO., LTD., Wuhan (CN)

(72) Inventors: Fanya Bi, Wuhan (CN); Xing Wang, Wuhan (CN); Hua Tan, Wuhan (CN); Zhe Sun, Wuhan (CN); Bo Yu, Wuhan (CN); Guangyao Han, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 18/514,409

(22) Filed: Nov. 20, 2023

(65) Prior Publication Data
US 2025/0060884 A1 Feb. 20, 2025

Related U.S. Application Data

(63) Continuation of application No. PCT/CN2023/113895, filed on Aug. 18, 2023.

(51) Int. Cl.
*G06F 3/06* (2006.01)

(52) U.S. Cl.
CPC .......... *G06F 3/0616* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 9,075,707 B2* | 7/2015 | Hsiao | ................... | G06F 12/0246 |
| 2008/0313505 A1* | 12/2008 | Lee | ..................... | G06F 12/0246 |
| | | | | 714/E11.004 |
| 2009/0089485 A1* | 4/2009 | Yeh | ..................... | G06F 12/0246 |
| | | | | 711/159 |
| 2013/0304965 A1* | 11/2013 | Yeh | ..................... | G06F 12/0246 |
| | | | | 711/E12.008 |

(Continued)

FOREIGN PATENT DOCUMENTS

| CN | 112416813 A | 2/2021 |
|---|---|---|
| CN | 112527693 A | 3/2021 |

*Primary Examiner* — Kevin Verbrugge
(74) *Attorney, Agent, or Firm* — BAYES PLLC

(57) ABSTRACT

The present disclosure provides a memory system with a non-volatile memory that includes a plurality of storage areas. Each storage may include a plurality of first storage groups in a first area and a plurality of second storage groups in a second area. The first area may support physical addressing. The second area may not support physical addressing. A memory controller of the memory system may perform a wear leveling process by swapping a first storage group having a first group write count with a second storage group having a second group write count. The first group write count may be a maximum group write count among a plurality of group write counts corresponding to the plurality of first storage groups. The second group write count may be a minimum group write count among a plurality of group write counts corresponding to the plurality of second storage groups.

20 Claims, 6 Drawing Sheets

(56) References Cited

U.S. PATENT DOCUMENTS

| | | | |
|---|---|---|---|
| 2017/0300423 A1* | 10/2017 | Kamruzzaman | G11C 16/3495 |
| 2018/0067692 A1* | 3/2018 | Oh | G06F 3/0626 |
| 2018/0113636 A1* | 4/2018 | Kwon | G06F 3/0679 |
| 2021/0019058 A1* | 1/2021 | Zhu | G06F 12/0246 |
| 2022/0121375 A1* | 4/2022 | Kim | G06F 3/0616 |
| 2024/0361955 A1* | 10/2024 | Tan | G06F 12/0238 |

* cited by examiner

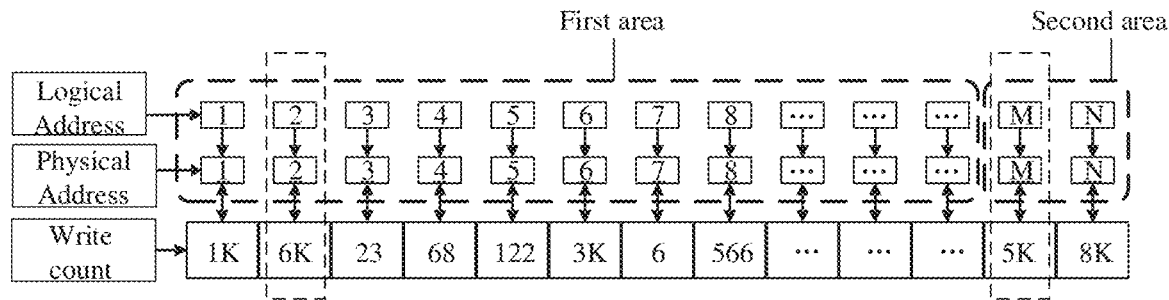
FIG. 3
| Logical Address | Physical Address |
|---|---|
| 1 | 1 |
| 2 | 2 |
| 3 | 3 |
| ... | ... |
| 7 | 7 |
| ... | ... |
| M | M |
| N | N |
FIG. 4
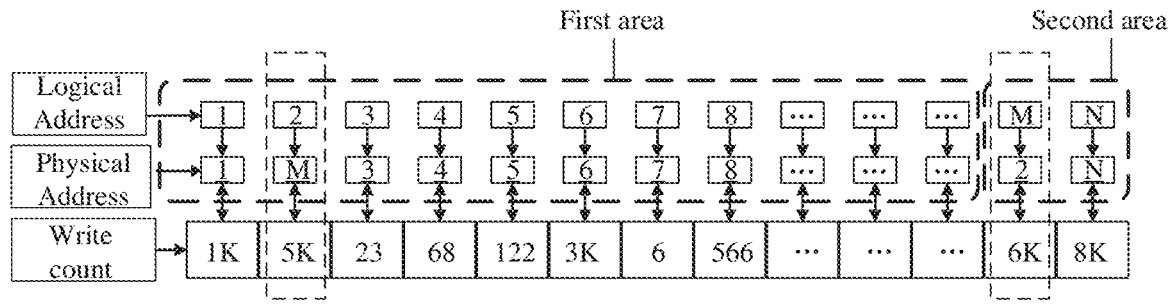
FIG. 5

| Logical Address | Physical Address |
|---|---|
| 1 | 1 |
| 2 | M |
| 3 | 3 |
| ... | ... |
| 7 | 7 |
| ... | ... |
| M | 2 |
| N | N |
FIG. 6
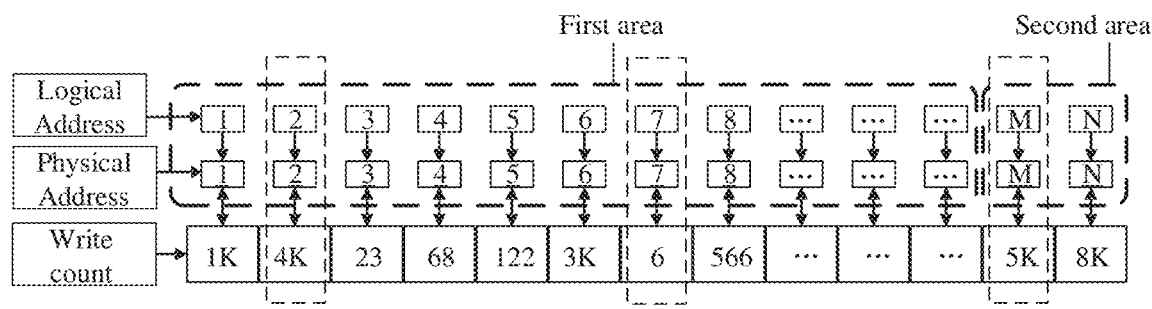
FIG. 7
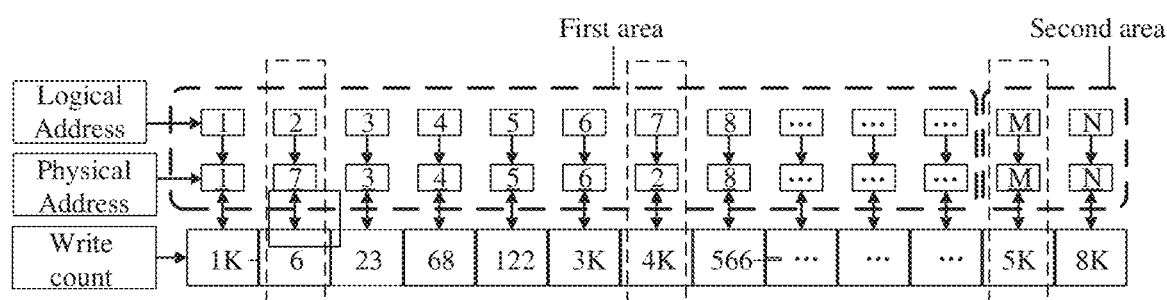
FIG. 8

MEMORY SYSTEM AND METHOD OF OPERATING THEREOF, AND COMPUTER-READABLE STORAGE MEDIUM

CROSS-REFERENCE TO RELATED APPLICATIONS

This application is a continuation of International Application No. PCT/CN2023/113895, filed on Aug. 18, 2023, which is incorporated herein by reference in its entirety.

TECHNICAL FIELD

The present disclosure relates to, but is not limited to, a memory system and method of operating thereof, and a computer-readable storage medium.

BACKGROUND

Non-Volatile Memory (NVM) has been widely applied in various fields, including embedded systems, such as computers, network interconnection devices, and voice, image, and data storage products, such as digital cameras, digital recorders, etc. As the requirements for storage capacity of these products are gradually increased, the process size of non-volatile memories continues to shrink, causing the reliability of non-volatile memories to face increasingly severe challenges. For instance, since non-volatile memories are limited by their own physical characteristics, non-volatile memories have limited write endurance during use. During use, if a specific storage location in the non-volatile memory is written to too many times and exceeds the write endurance, the storage location cannot be reliably used for subsequent storage operations. This negatively affects the data storage performance of the entire memory.

SUMMARY

According to one aspect of the present disclosure, a memory system is provided. The memory system may include a non-volatile memory. The non-volatile memory may include a plurality of storage areas. Each of the storage areas may include a plurality of first storage groups located in a first area. Each of the storage areas may include a plurality of second storage groups located in a second area. The first area may support physical addressing. The second area may not support physical addressing. The memory system may include a memory controller coupled to the non-volatile memory. The memory controller may be configured to perform a wear leveling process by swapping a first storage group having a first group write count with a second storage group having a second group write count. The first group write count may be a maximum group write count among a plurality of group write counts corresponding to the plurality of first storage groups. The second group write count may be a minimum group write count among a plurality of group write counts corresponding to the plurality of second storage groups.

In some implementations, the memory controller may be configured to compare the first group write count to the second group write count. In some implementations, the memory controller may be configured to, when the first group write count is greater than the second group write count, perform wear leveling process by swapping the first storage group having the first group write count with a second storage group having the second group write count.

In some implementations, the memory controller may be configured to, when the first group write count is less than or equal to the second group write count, perform the wear leveling process by swapping the first storage group having the first group write count with the first storage group having a third group write count. In some implementations, the third group write count may be a minimum group write count among the plurality of group write counts corresponding to the plurality of first storage groups.

In some implementations, the memory controller may be configured to perform the wear leveling process by swapping data stored in the first storage group having the first group write count with data stored in the second storage group having the second group write count, and by swapping a logical address of the first storage group having the first group write count with a logical address of the second storage group having the second group write count. In some implementations, the memory controller may be configured to perform the wear leveling process by swapping the data stored in the first storage group having the first group write count and data stored in the first storage group having the third group write count, and by swapping a logical address of the first storage group having the first group write count with a logical address of the first storage group having the third group write count.

In some implementations, the memory controller may be configured to, before comparing the first group write count to the second group write count, compare the first group write count to a first preset threshold. In some implementations, the memory controller may be configured to, when the first group write count is greater than the first preset threshold, compare the first group write count to the second group write count.

In some implementations, the first preset threshold may increase as an electrical distance between the first storage group corresponding to the first group write count and a voltage source increases.

In some implementations, the first storage group and the second storage group may each include a first number of memory cells. In some implementations, the memory controller may be configured to update a mapping table between a logical address and a physical address of each storage group of a storage area after the wear leveling process, and store the mapping table into a volatile memory of the memory controller.

In some implementations, the first storage group and the second storage group may each include a second number of memory cells less than the first number of memory cells. In some implementations, the memory controller may be configured to update the mapping table between a logic address and a physical address of each storage group of the storage area after the wear leveling process, and store the mapping table into the non-volatile memory.

In some implementations, the group write count may be obtained by counting using a double Bloom filter.

In some implementations, the memory system may further include a storage-class memory system. In some implementations, the non-volatile memory may further include a phase change memory.

According to another aspect of the present disclosure, a method of operating a memory system is provided. The method may include performing, by a memory controller coupled to a non-volatile memory, a wear leveling process by swapping a first storage group having a first group write count with a second storage group having a second group write count. The non-volatile memory may include a storage area. The first storage group may be included in a plurality of first storage groups located in a first area of the non-volatile memory and the second group may be included in a plurality of second storage groups in a second area of the non-volatile memory. The first area may support physical addressing and the second area may not support physical addressing. The first group write count may be a maximum group write count among a plurality of group write counts corresponding to the plurality of first storage groups. The second group write count may be a minimum group write count among a plurality of group write counts corresponding to the plurality of second storage groups.

In some implementations, the method may include comparing, by the memory controller, the first group write count to the second group write count. In some implementations, when the first group write count is greater than the second group write count, the method may include performing, by the memory controller, wear leveling process by swapping the first storage group having the first group write count with a second storage group having the second group write count.

In some implementations, when the first group write count is less than or equal to the second group write count, the method may include performing, by the memory controller, the wear leveling process by swapping the first storage group having the first group write count with the first storage group having a third group write count. In some implementations, the third group write count may be a minimum group write count among the plurality of group write counts corresponding to the plurality of first storage groups.

In some implementations, the method may include performing, by the memory controller, the wear leveling process by swapping data stored in the first storage group having the first group write count with data stored in the second storage group having the second group write count, and by swapping a logical address of the first storage group having the first group write count with a logical address of the second storage group having the second group write count. In some implementations, the method may include performing, by the memory controller, the wear leveling process by swapping the data stored in the first storage group having the first group write count and data stored in the first storage group having the third group write count, and by swapping a logical address of the first storage group having the first group write count with a logical address of the first storage group having the third group write count.

In some implementations, before comparing the first group write count to the second group write count, the method may include comparing, by the memory controller, the first group write count to a first preset threshold. In some implementations, when the first group write count is greater than the first preset threshold, the method may include comparing, by the memory controller, the first group write count to the second group write count.

In some implementations, the first storage group and the second storage group may each include a first number of memory cells or a second number of memory cells less than the first number. In some implementations, the method may further include updating, by the memory controller, a mapping table between a logical address and a physical address of each storage group of the storage area after the wear leveling process, and storing, by the memory controller, the mapping table into a volatile memory of the memory controller. In some implementations, the method may include updating, by the memory controller, the mapping table between a logic address and a physical address of each storage group of the storage area after the wear leveling process, and storing, by the memory controller, the mapping table into the non-volatile memory.

According to a further aspect of the present disclosure, a non-transitory computer-readable storage medium storing instructions is provided. The instructions, which when executed by a processor, may cause the processor to perform a wear leveling process by swapping a first storage group having a first group write count with a second storage group having a second group write count. The first storage group and the second storage group may be associated with a non-volatile memory. The first storage group may be included in a plurality of first storage groups located in a first area of the non-volatile memory and the second group may be included in a plurality of storage groups in a second area of the non-volatile memory. The first area may support physical addressing and the second area does not support physical addressing. The first group write count may be a maximum group write count among a plurality of group write counts corresponding to the plurality of first storage groups. The second group write count may be a minimum group write count among a plurality of group write counts corresponding to the plurality of second storage groups.

In some implementations, the instructions, which when executed by the processor, may further cause the processor to compare the first group write count to the second group write count. In some implementations, the instructions, which when executed by the processor, may further cause the processor to, when the first group write count is greater than the second group write count, perform the wear leveling process by swapping the first storage group having the first group write count with a second storage group having the second group write count.

In some implementations, the instructions, which when executed by the processor, may further cause the processor to, when the first group write count is less than or equal to the second group write count, perform wear leveling process by swapping the first storage group having the first group write count with the first storage group having a third group write count. In some implementations, the third group write count may be a minimum group write count among the plurality of group write counts corresponding to the plurality of first storage groups.

In some implementations, the instructions, which when executed by the processor, may further cause the processor to perform the wear leveling process by swapping data stored in the first storage group having the first group write count with data stored in the second storage group having the second group write count, and by swapping a logical address of the first storage group having the first group write count with a logical address of the second storage group having the second group write count. In some implementations, the instructions, which when executed by the processor, may further cause the processor to perform the wear leveling process by swap the data stored in the first storage group having the first group write count and data stored in the first storage group having the third group write count, and by swapping a logical address of the first storage group having the first group write count with a logical address of the first storage group having the third group write count.

In some implementations, the instructions, which when executed by the processor, may further cause the processor to, before comparing the first group write count to the second group write count, compare the first group write count to a first preset threshold. In some implementations, the instructions, which when executed by the processor, may further cause the processor to, when the first group write count is greater than the first preset threshold, compare the first group write count to the second group write count.

BRIEF DESCRIPTION OF THE DRAWINGS

In the drawings, the same reference numbers refer to the same or similar parts or elements throughout the several figures, unless otherwise specified. The drawings are not necessarily to scale. It should be understood that these drawings depict only some implementations disclosed in accordance with the present application and should not be considered as limiting the scope of the present application.

FIG. 3 is a schematic diagram of the distribution of group write counts corresponding to storage groups in different storage areas, according to an implementation of the present application.

FIG. 4 is a mapping table between logical addresses and physical addresses in FIG. 3.

FIG. 5 is a schematic diagram of the distribution of group write counts corresponding to storage groups in different storage areas after wear leveling process, according to an implementation of the present application.

FIG. 6 is a mapping table between logical addresses and physical addresses in FIG. 5.

FIG. 7 is a schematic diagram of the distribution of group write counts corresponding to storage groups in different storage areas, according to another implementation of the present application.

FIG. 8 is a schematic diagram showing the distribution of group write counts corresponding to storage groups in different storage areas after wear leveling process, according to another implementation of the present application.

DETAILED DESCRIPTION

Figure 1:
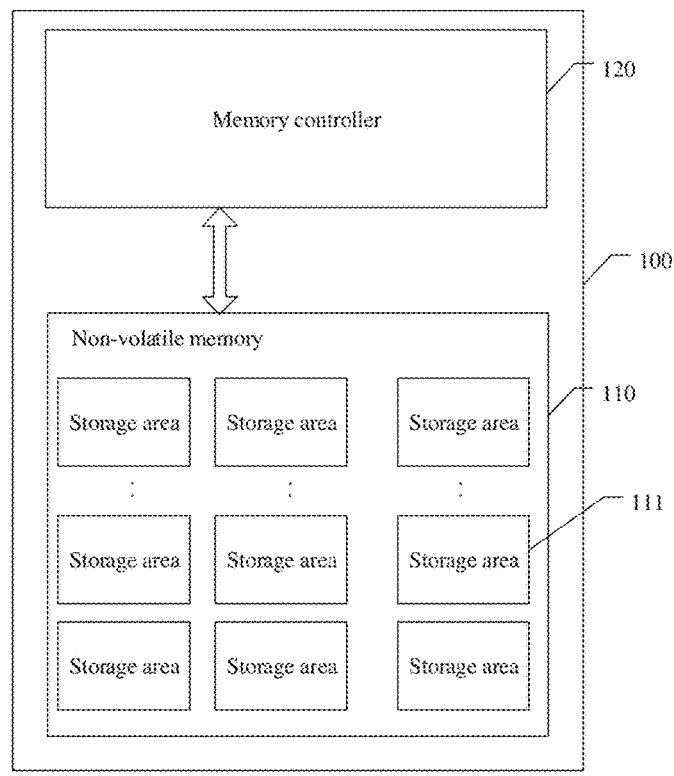
FIG. 1 is a block diagram of a memory system, according to an implementation of the present application.

Exemplary implementations disclosed herein will be described in more detail below with reference to the accompanying drawings. Although exemplary implementations of the present application are shown in the drawings, it should be understood that the present application may be implemented in various forms and should not be limited to the specific implementations set forth herein. Rather, these implementations are provided to enable a more thorough understanding of the present application, and to fully convey the scope of the disclosure to those skilled in the art.

In the following description, numerous specific details are given in order to provide a thorough understanding of the present application. However, it will be apparent to one skilled in the art that the present application may be practiced without one or more of these details. In other instances, in order to avoid confusion with this application, some technical features that are well known in the art are not described. That is, not all features of actual implementations are described herein, and well-known functions and structures are not described in detail.

Furthermore, the drawings are merely schematic illustrations of the present application and are not necessarily drawn to scale. The same reference numerals in the drawings represent the same or similar parts, and thus their repeated description will be omitted. Some of the block diagrams shown in the figures are functional entities and do not necessarily correspond to physically or logically separate entities. These functional entities may be implemented in software form, or implemented in one or more hardware modules or integrated circuits, or implemented in different networks and/or processor devices and/or microcontroller devices.

The flowcharts shown in the drawings are illustrative only and do not necessarily include all operations. For example, some operations can be broken down, and some operations can be merged or partially merged, so the actual order of execution may change depending on the actual situation.

The terminology used herein is for the purpose of describing particular implementations only and is not intended to be limiting of the application. As used herein, the singular forms "a", "an", and "said/the" are intended to include the plural forms as well, unless the context clearly dictates otherwise. It will also be understood that the terms "comprised of" and/or "comprising", when used in this specification, identify the presence of stated features, integers, steps, operations, elements and/or parts but do not exclude the existence of one or more other features, integers, steps, operations, elements, parts and/or groups. When used herein, the term "and/or" includes any and all combinations of the associated listed items.

Because new non-volatile memories represented by Flash, Phase Change Memory (PCM), Resistive Random Access Memory (RRAM), Ferroelectric Random Access Memory (FRAM), magnetic random access memory, Magnetoresistive Random Access Memory (MRAM) and Nantero's CNT Random Access Memory (NRAM) have advantages such as fast access speed, low energy consumption, and non-volatile storage, non-volatile memory are becoming more widely used. However, most non-volatile memories (such as Flash, PCM, RRAM, FRAM, etc.) have the disadvantage of limited write times, and the upper limit of write times of non-volatile memories decreases with the increase in storage capacity, resulting in the shortened lifetime of non-volatile memory. For example, Flash can usually be written $10^4$ times, PCM can usually be written $10^8$ times, RRAM can be written $10^5$ times, and so on.

Taking PCM as an example, the basic principle of PCM is to apply an electrical pulse with a large signal value and a short duration (e.g., high and narrow) to the phase change memory cell. Under the action of Joule heat, a part of the phase change storage layer in the initial crystalline state melts because the temperature is higher than a melting temperature. After the electrical pulse is interrupted, the melted part cools quickly and stays in an amorphous state with low atomic order, thereby completing the conversion from low resistance to high resistance, which is the erasure (reset) process. The molten part in this process is called the programming volume. If an electrical pulse with a small signal value and a long duration (e.g., low and broad) is applied, the temperature in the programming volume reaches above the crystallization temperature and below the melting temperature, and lasts for enough time to effect crystallization of the amorphous structure within the programming volume, thus obtaining a low-resistance state, which is the write (set) process. During the reading process of PCM, a low and narrow electrical pulse is applied to the phase change memory cell, so that the phase change memory layer is below the crystallization temperature, and the resistance of the phase change memory cell is measured.

The performance of phase change storage materials, as the storage medium of PCM, directly affects the performance of the device. The wear of phase change memory materials is mainly associated with the number of writes. When the number of writes is evenly distributed, the wear of the phase change storage material will also be relatively uniform, which can maintain the phase change characteristics and stability of the phase change storage material and prevent thermal drift and phase change failure caused by excessive writing. PCM can reach a service life of more than 5 years. However, in actual applications, due to the unevenness of data access patterns and write operations, the number of writes in PCM will produce uneven distribution among memory cells, which may cause serious wear of the phase change storage material on some memory cells, and failure in a short period of time (such as weeks or months), causing the PCM to work improperly. Therefore, wear leveling may be used to evenly distribute the number of writes to different memory cells to avoid the failure of the entire PCM caused by the failure of a certain memory cell.

Wear leveling is one of the main ways to improve the lifetime of non-volatile memory. Write operations to non-volatile memory are evenly distributed to various target addresses, so that the wear level of each storage location of a non-volatile memory reaches more balanced degree. However, traditional wear leveling requires a high swapping frequency, which causes a lot of storage space and performance overhead. At the same time, the data swap granularity of wear leveling used in related technologies is single and fixed, and it is impossible to perform flexible and more precise wear leveling on non-volatile memories. In addition, traditional wear leveling cannot resist malicious attacks. For example, phase change memory can perform in-situ write operations. That is, there is no need to perform an erase operation in advance before the write operation, but directly replaces the previously written data with newly written data in place. Based on this, malicious attack programs can infer the new locations of the memory blocks to be swapped by detecting the changes in the mapping of logical addresses to physical addresses during wear leveling, thereby repeatedly performing in-situ write operations on a specific location, leading to rapid failure of the phase change memory.

In view of this, implementations of the present application provide a memory system, method of operating thereof, and a computer-readable storage medium.

FIG. 1 is a block diagram of a memory system according to an implementation of the present application. As shown in FIG. 1, according to a first aspect of an implementation of the present application, a memory system is provided. The memory system 100 includes, e.g., a non-volatile memory 110 including a plurality of storage areas 111.

Figure 2:
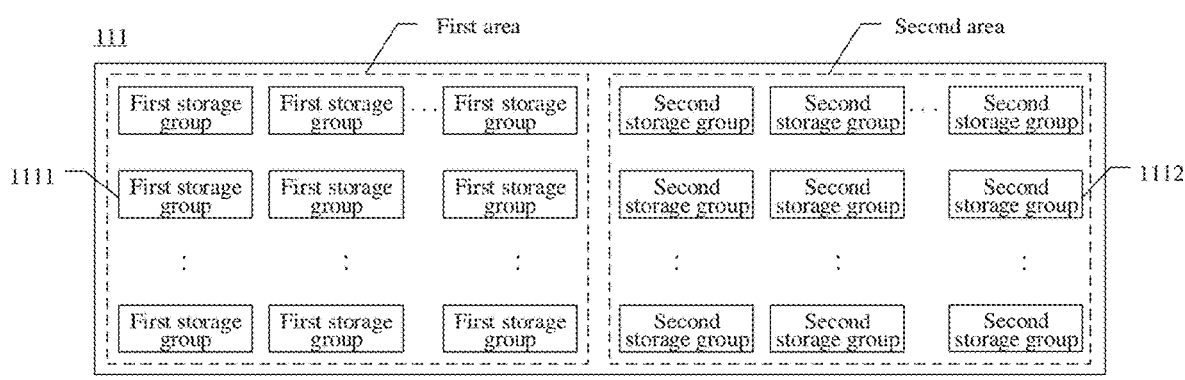
FIG. 2 is a block diagram of a storage area, according to an implementation of the present application.

FIG. 2 is a block diagram of a storage area according to an implementation of the present application. Combining FIGS. 1 and 2, each storage area 111 includes a plurality of first storage groups 1111 located in a first area and a plurality of second storage groups 1112 located in a second area. The first area supports physical addressing, and the second area does not support physical addressing. The memory system 100 further includes a memory controller 120 that is coupled to the non-volatile memory 110 and configured to perform a wear leveling process by swapping the first storage group 1111 with a first group write count with the second storage group 1112 with a second group write count. The first group write count is the maximum group write count among a plurality of group write counts corresponding to the plurality of first storage groups 1111, and the second group write count is the minimum group write count among the plurality of group write counts corresponding to the plurality of second storage groups 1112.

Here, each first storage group in the first area has a logical address and a corresponding physical address. The first area supports physical addressing, which means that an external device (e.g., a host) can directly access the first area by using the mapping relationship between logical addresses and physical addresses.

Each second storage group in the second area has a logical address and a corresponding physical address. The second area does not support physical addressing, which means that the logical address of the second storage group is not visible to external devices (e.g., the host). Thus, the external device cannot directly access the second area by using the mapping relationship between the logical address and the physical address of the second storage group. That is, the external device cannot perform a read operation or write operation on the second storage group of the second area.

In some implementations, the second storage group of the second area may be used to store dirty data.

It should be noted that the first group write count is the maximum group write count among all group write counts corresponding to all first storage groups in the first area. The second group write count is the minimum group write count among all group write counts corresponding to all second storage groups in the second area.

The implementation of the present application divides each storage area in the non-volatile memory into a first area that supports physical addressing and a second area that does not support physical addressing. When performing wear leveling process, a first storage group having a first group write count is swapped with a second storage group having a second group write count to move the first storage group having the first group write count from the first area to the second area. This prevents the first storage group having the maximum group write count among the multiple first storage groups from still residing in the first area that supports physical access after the wear leveling process. The risk can be avoided that the first storage group having the maximum group write count among the multiple first storage groups is still physically accessed after wear leveling process.

In some implementations, the memory system 100 may be a mobile phone, desktop computer, laptop computer, tablet computer, vehicle computer, or any other suitable electronic device having non-volatile memory 110 therein.

In some implementations, a memory controller 120 may control the overall operation of the memory system 100. The memory controller 120 may store data into non-volatile memory 110 or may read data stored in non-volatile memory 110.

In some implementations, non-volatile memory 110 may include one of phase change memory, resistive random access memory, magnetic random access memory, and carbon nanotube random access memory.

In some implementations, the memory controller 120 may also store various information (e.g., mapping tables) required for the operation of the memory system 100 into the non-volatile memory 110 or into the volatile memory of the memory controller 120.

Memory controller 120 may also be configured to manage various functions with respect to data stored or to be stored in non-volatile memory 110, including but not limited to bad block management, garbage collection, logical to physical address translation, wear leveling, etc. In some implementations, the memory controller 120 is further configured to process an Error Correction Code (ECC) regarding data read from or written to the non-volatile memory 110.

Memory controller 120 may also perform any other suitable functions, such as formatting non-volatile memory 110. Memory controller 120 may communicate with external devices according to specific communication protocols. For example, the memory controller 120 may communicate with external devices via at least one of various interface protocols, such as USB protocol, MMC protocol, Peripheral Component Interconnect (PCI) protocol, PCI Express (PCI-E) protocol, Advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

In this implementation of the present application, both the first storage group and the second storage group include a first number of memory cells. Alternatively, both the first storage group and the second storage group include a second number of memory cells. The first number may be greater than the second number.

For example, the non-volatile memory 110 may be divided into multiple storage areas, and then each storage area may be divided into multiple storage groups. The first memory group and the second memory group each include the second number of memory cells.

In some implementations, the size of the first storage group and the second storage group may be the same as the size of a Code Word (CW), where the code word includes user data, ECC, and metadata. The size of the code word may be codetermined by the size of the user data, the size of the ECC, and the size of the metadata. The size of user data is often determined based on the actual amount of data to be stored or transmitted. User data can be in bits, bytes, words or other units, depending on the requirements for memory system and data transmission. ECC is redundant information added to user data in order to detect and correct errors in data transmission or storage. The size of the ECC depends on the size of the user data and the required error correction capability. Metadata contains information about code words, such as data format, check code type, error detection and correction scheme, logical address to physical address mapping table and other information. The size of the metadata depends on the design and implementation of the memory system and the management and control capabilities required. In general, different memory systems may choose code words of different size to meet their demands in terms of performance, reliability, and storage. It can be understood that a code word may include multiple memory cells, and the number of memory cells included in a code word may be adjusted according to actual conditions.

In a specific implementation, the size of the ECC is 256 B, and the size of the code word is 4 KB. It can be understood that the sizes of the first storage group and the second storage group are also 4 KB. Taking the non-volatile memory 110 being a phase change memory as an example, the second number is $2^{12}$.

In some implementations, the ratio of the first number to the second number ranges from $2^4$ to $2^{12}$. For example, the ratio of the first number to the second number ranges from $2^4$, $2^8$, or $2^{12}$.

In some implementations, the sizes of the first storage group and the second storage group may be the same as the size of the block. Generally, the size of a block is 512 KB (4 KB*$2^7$) or 1024 KB (4 KB*$2^8$), or even larger. It can be understood that the block may include multiple memory cells, and the number of memory cells included in the block may be adjusted according to actual conditions.

In a specific implementation, the size of the block is 1024 KB. It can be understood that the sizes of the first storage group and the second storage group are also 1024 KB. Taking the non-volatile memory 110 as an example of a phase change memory, the first number is $2^{20}$.

It should be noted that the first number and the second number in the above implementation are only an example. The storage area, the first storage group and the second storage group may be divided into different sizes according to the actual size and type of the non-volatile memory.

In traditional wear leveling, smaller data swap granularity may lead to frequent data movement and copying, increasing space overhead, while larger data swap granularity may lead to wear imbalance problems. This application flexibly divides the data swap granularity of wear leveling into different levels. It is possible to divide the size of the first storage group and the second storage group into the first number of memory cells at a first granularity level, or divide the size of the first storage group and the second storage group into the second number of memory cells at a second granularity level. That is to say, the present application can reasonably divide the data swap granularity of wear leveling according to the actual size of the non-volatile memory, so as to increase the flexibility and fitness of the wear leveling process for non-volatile memory.

In the implementation of the present application, wear leveling process can be performed on the non-volatile memory at different granularity levels, which can greatly improve the flexibility and fitness of the wear leveling process on the non-volatile memory. In the implementation of the present application, the memory controller 120 may be configured to compare the first group write count to the second group write count, and when the first group write count is greater than the second group write count, perform wear leveling process by swapping the first storage group having the first group write count with a second storage group having the second group write count.

In the implementation of the present application, the memory controller 120 may be configured to perform wear leveling process by swapping data stored in the first storage group having the first group write count with data stored in the second storage group having the second group write count, and by swapping the logical address of the first storage group having the first group write count with the logical address of the second storage group having the second group write count.

FIG. 3 is a schematic diagram of the distribution of group write counts corresponding to storage groups in different storage areas according to an implementation of the present application. FIG. 4 is a mapping table between logical address and physical address in FIG. 3. As shown in FIGS. 3 and 4, the storage area includes a plurality of first storage groups located in the first area and a plurality of second storage groups located in the second area. The logical addresses and physical addresses of the first storage group and the second storage group all have a one-to-one mapping relationship. Each first storage group has a group write count, and each second storage group also has a group write count. The write count shown in FIG. 3 is the current group write count of each storage group.

Referring to FIG. 3, it can be seen that the group write count of the first storage group corresponding to the physical address 2 mapped by the logical address 2 is 6K, and the group write count of the first storage group is the maximum value among the group write counts of all first storage groups. That is, the first group write count is 6K. The group write count of the second storage group corresponding to the physical address M mapped by the logical address M is 5K, and the group write count of the second storage group is the minimum value of the group write counts of all second storage groups. That is, the second group write count is 5K. At this time, the first group write count is greater than the second group write count.

It should be noted that the number of second storage groups shown in FIG. 3 is only an example and is not used to limit the number of second storage groups in the implementation of the present application.

FIG. 5 is a schematic diagram of the distribution of group write counts corresponding to storage groups in different storage areas after wear leveling process according to an implementation of the present application. FIG. 6 is a mapping table between logical addresses and physical addresses in FIG. 5. Referring to FIGS. 5 and 6, the memory controller 120 may be configured to perform wear leveling process by swapping data stored in the first storage group corresponding to the physical address 2 mapped by the logical address 2 with data stored in the second storage group corresponding to the physical address M mapped by the logical address M, and by swapping the logical address of the first storage group corresponding to physical address 2 with the logical address of the second storage group corresponding to physical address M.

As shown in FIG. 5 and FIG. 6, after wear leveling process, physical address 2 corresponds to logical address M, and physical address M corresponds to logical address 2. Since the first storage group having the first group write count is swapped to the second area that does not support physical access, the first storage group having the first group write count will not be physically accessed in subsequent writes. Even if a malicious attack program can infer the new location to be swapped by detecting the changes in the mapping of logical addresses to physical addresses during wear leveling, it cannot conduct a powerful attack on the second area that does not support physical access. In other words, the memory system in the implementation of this application can resist malicious attacks when performing wear leveling.

In some implementations, when both the first storage group and the second storage group include a first number of memory cells, the memory controller 120 may be configured to update the mapping table between the logical address and the physical address of each storage group of the storage area after the wear leveling process, and store the mapping table into the volatile memory of the memory controller 120.

In some implementations, when both the first memory group and the second memory group include a first number of memory cells, the mapping tables shown in FIGS. 4 and 6 are stored in a volatile memory (e.g., Static Random Access Memory (SRAM)) of the memory controller 120. Since the first storage group and the second storage group have a first number of memory cells, the total number of divided first storage groups and second storage groups is relatively small for the entire non-volatile memory. Thus, the mapping table reflecting the correspondence between the logical address and the physical address of the first storage group and the second storage group also occupies less space. In this way, storing the above-mentioned mapping table into the memory controller allows the memory controller to speed up access to the above-mentioned mapping table without occupying too much space of the memory controller and without additionally increasing the burden on the memory controller. In a specific example, when the sizes of the first storage group and the second storage group are the same as the size of the block, a mapping table used to reflect the correspondence between the logical address and the physical address of the first storage group and the second storage group is stored in the volatile memory of the memory controller.

In other implementations, when both the first storage group and the second storage group include a second number of memory cells, the memory controller may be configured to update the mapping table between logical addresses and physical addresses of each storage group of the storage area after the wear leveling process, and store the mapping table into the non-volatile memory 110. As an example, when both the first storage group and the second storage group include the second number of memory cells, the mapping tables shown in FIGS. 4 and 6 are stored in the metadata of the non-volatile memory 110 of the memory controller 120.

Since the first storage group and the second storage group have a second number of memory cells, the total number of divided first storage groups and second storage groups is relatively large for the entire non-volatile memory. At this time, the mapping table used to reflect the correspondence between the logical address and the physical address of the first storage group and the second storage group occupies more space. If the mapping table is stored in the volatile memory of the memory controller, the space utilization of the memory controller will be greatly reduced, additional burden will be added to the memory controller, and system performance will be affected. Therefore, the above mapping table is stored in metadata in the non-volatile memory to balance space efficiency and system performance. In a specific example, when the size of the first storage group and the second storage group is the same as the size of the code word, the mapping table used to reflect the correspondence between the logical address and the physical address of the first storage group and the second storage group is stored in the metadata of the code word. When the memory controller needs to access the above mapping table, it needs to read the metadata to obtain the above mapping table.

In the implementation of the present application, the memory controller is further configured to, when the first group write count is less than or equal to the second group of write counts, perform the wear leveling process by swapping the first storage group having the first group write count with the first storage group having a third group write count. The third group write count is the minimum group write count among the plurality of group write counts corresponding to the plurality of first storage groups.

The wear leveling process may be implemented by swapping data stored in the first storage group having the first group write count with data stored in the first storage group having the third group write count, and by swapping the logical address of the first storage group having the first group write count with the logical address of the first storage group having the third group write count.

FIG. 7 is a schematic diagram of the distribution of group write counts corresponding to storage groups in different storage areas according to another implementation of the present application. The mapping table between logical addresses and physical addresses in FIG. 7 can be referred to in FIG. 4, as an example. As shown in FIG. 4 and FIG.

7, the group write count of the first storage group corresponding to the physical address 2 mapped by the logical address 2 is 4K, and the group write count of the first storage group is the maximum value among the group write counts of all first storage groups. That is, the first group write count is 4K. The group write count of the second storage group corresponding to the physical address M mapped by the logical address M is 5K, and the group write count of the second storage group is the minimum value among the group write counts of all second storage groups. That is, the second group write count is 5K. The first group write count is less than the second group write count.

The group write count of the first storage group corresponding to the physical address 7 mapped by the logical address 7 is 6, and the group write count of the first storage group is the minimum value among the group write counts of all first storage groups. That is, the third group write count is 6.

Figures 9, 10:
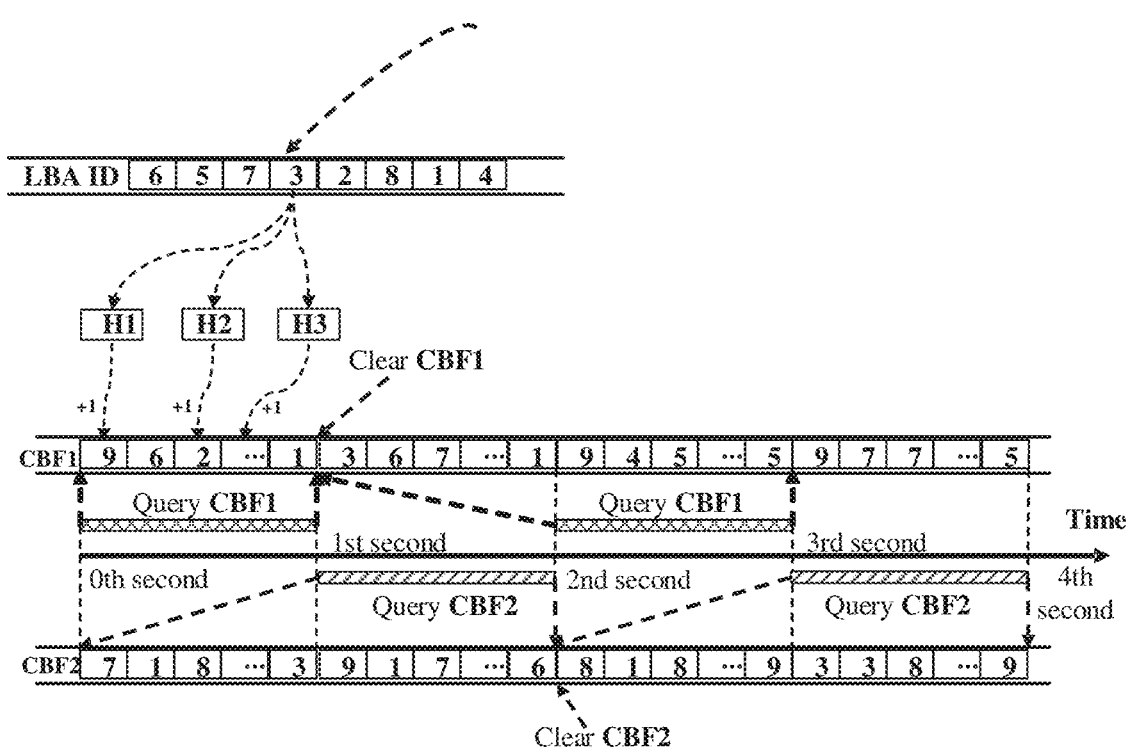
FIG. 9 is a mapping table between logical addresses and physical addresses in FIG. 8.
FIG. 10 is a schematic diagram of the use process of a double Bloom filter, according to an implementation of the present application.

FIG. 8 is a schematic diagram of the distribution of group write counts corresponding to storage groups in different storage areas after wear leveling process according to another implementation of the present application. FIG. 9 is a mapping table between logical addresses and physical addresses in FIG. 8. Referring to FIGS. 8 and 9, the memory controller 120 may be configured to perform wear leveling process by swapping data stored in the first storage group corresponding to the physical address 2 mapped by the logical address 2 with the data stored in the first storage group corresponding to the physical address 7 mapped by the logical address 7, and by swapping the logical address of the first storage group corresponding to physical address 2 with the logical address of the second storage group corresponding to physical address 7.

As shown in FIGS. 8 and 9, after wear leveling process, physical address 2 corresponds to logical address 7, and physical address 7 corresponds to logical address 2. Since the first group write count is less than the second group write count, it means that the first storage group having the first group write count can still withstand a certain number of write operations. Therefore, wear leveling process is performed by swapping the first storage group having the maximum group write count with the first storage group having the minimum group write count in the first area, which can achieve the effect of balancing the degree of wear of multiple first storage groups.

In some implementations, when both the first storage group and the second storage group include the first number of memory cells, the memory controller 120 may be configured to update the mapping table between the logical address and the physical address of each storage group of the storage area after the wear leveling process, and store the mapping table into the volatile memory of the memory controller 120. As an example, when both the first memory group and the second memory group include a first number of memory cells, the mapping table shown in FIG. 9 is stored in a volatile memory (such as a static random access memory) of the memory controller 120.

In other implementations, when both the first storage group and the second storage group include the second number of memory cells, the memory controller may be configured to update the mapping table between the logical address and the physical address of each storage group of the storage area after the wear leveling process, and store the mapping table into the non-volatile memory 110. As an example, when both the first storage group and the second storage group include the second number of memory cells, the mapping table shown in FIG. 9 is stored in the metadata of the non-volatile memory 110 of the memory controller 120.

In the implementation of the present application, the memory controller 120 may be configured to, before comparing the first group write count to the second group write count, compare the first group write count to a first preset threshold. In the implementation of the present application, the memory controller 120 may be configured to, when the first group write count is greater than the first preset threshold, compare the first group write count to the second group write count.

Taking FIG. 7 as an example for illustration, for example, the first preset threshold is set to 3500, the group write count of the first storage group corresponding to the physical address 2 mapped by the logical address 2 is 4K, and the group write count of the first storage group is the maximum value among the group write counts of all first storage groups, that is, the first group write count is 4K. That is, when the first group write count is greater than the first preset threshold, the memory controller starts to perform wear leveling.

It can be understood that when the first group write count is greater than the first preset threshold and the second group write count, the memory controller 120 may be configured to perform wear leveling process by swapping the first storage group having the first group write count in the first storage area with the second storage group having the second group write count in the second area.

When the first group write count is greater than the first preset threshold but less than the second group write count, the memory controller 120 may be configured to perform wear leveling process by swapping the first storage group having the first group write count with the first storage group having the third group write counts in the first area.

When the first group write count is less than or equal to the first preset threshold, the memory controller 120 may be configured to not perform wear leveling process.

In some implementations, the memory controller may be configured to compare the first group write count to the first preset threshold within a preset period which may range from 1 second to 5 seconds.

In the implementation of the present application, the first preset threshold increases as the electrical distance (ED) between the first storage group corresponding to the first group write count and a voltage source increase.

In some implementations, the first storage group corresponding to the first group write count that is closer to the voltage source is more susceptible to the influence of the voltage source. For example, damage to the first storage group will be accelerated due to surge or leakage of the voltage source. It can be understood that as the electrical distance between the first storage group corresponding to the first group write count and the voltage source decreases, the overall service life of the first storage group also decreases. As a result, the upper limit of the number of writes of the first storage group, e.g., the first preset threshold, will also be reduced accordingly to perform wear leveling process on the first storage group before reaching the upper limit of the number of writes to prevent the first storage group from prematurely reaching its service life.

The greater the electrical distance between the first storage group corresponding to the first group write count and the voltage source, the less affected the first storage group will be by the voltage source, and the overall service life of the first storage group will not be reduced due to the surge or leakage of the voltage source. Therefore, the upper limit of the number of writes of the first storage group, e.g., the first preset threshold, will be greater.

Table 1 is an example of the electrical distance between the first storage group corresponding to the first group write count and the voltage source and the first preset threshold. As shown in Table 1, "NN" indicates that the electrical distance between the first storage group corresponding to the first group write count and the voltage source is near, and the corresponding first preset threshold is 400. "MM" indicates that the electrical distance between the first storage group corresponding to the first group write count and the voltage source is middle, and the corresponding first preset threshold is 800. "FF" indicates that the electrical distance between the first storage group corresponding to the first group write count and the voltage source is far, and the corresponding first preset threshold is 1600.

TABLE 1

| Electrical Distance (ED) | First Preset Threshold |
|---|---|
| NN | 400 |
| MM | 800 |
| FF | 1600 |

It should be noted that the value of the first preset threshold shown in Table 1 is only an example and is not used to limit the range of the first preset threshold in the implementation of the present application.

In the implementation of the present application, the group write count is obtained by counting the double Bloom filter.

FIG. 10 is a schematic diagram of the use process of a double Bloom filter according to an implementation of the present application. In a double Bloom filter, one Bloom filter is used to store forward data (such as inserted elements) and the other Bloom filter is used to store reverse data (such as deleted elements). When inserting an element, it is inserted into a forward Bloom filter and a reverse Bloom filter. When querying whether an element exists, both the forward Bloom filter and the reverse Bloom filter may be checked. Only when it is determined that the element exists in both the forward Bloom filter and the reverse Bloom filter, the existence of the element may be determined.

As shown in FIG. 10, when the size of the first storage group and the second storage group is the same as the size of the block, a mapping table used to reflect the correspondence between the logical addresses and the physical addresses of the first storage group and the second storage group is stored in the SRAM of the memory controller. The logical block address (LBA) identification (ID) shown in FIG. 10 is the LBA of different first storage groups in a storage area. When a new LBA is accessed, the corresponding LBA ID (such as LBA ID3 shown in FIG. 10) will be inserted into the forward Bloom filter CBF1 and the reverse Bloom filter CBF2. In an example, LBA ID3 is taken as input, three hash values (H1, H2, H3) are calculated by using three hash functions. The corresponding bit in the bit array of the forward Bloom filter is set to 1, indicating that LBA ID3 exists in the forward Bloom filter CBF1. Similarly, LBA ID3 is taken as input, and three hash values are calculated by using three hash functions. The corresponding bit in the bit array of the reverse Bloom filter CBF2 is set to 1, indicating that LBA ID3 exists in the reverse Bloom filter CBF2.

For subsequent alternate queries of forward Bloom filter CBF1 and reverse Bloom filter CBF2, the same hash function can be used to calculate the hash value, and whether the corresponding bit is 1 is checked, to determine whether the corresponding LBA ID3 exists in forward Bloom filter CBF1 and reverse Bloom filter CBF2.

As an example, taking the element to be queried (such as LBA ID3) as input, multiple hash values are calculated by using the hash function of the forward Bloom filter CBF1 at the 0th second. The bit array of the forward Bloom filter CBF1 is checked to determine whether the bits corresponding to the calculated hash value are all 1. If any of them is 0, it can be determined that the element does not exist in the forward Bloom filter CBF1, and the group write count is not incremented.

Taking the element to be queried (such as LBA ID3) as input, multiple hash values are calculated by using the hash function of the forward Bloom filter CBF1. The bit array of the forward Bloom filter CBF1 is checked to determine whether the bits corresponding to the calculated hash value are all 1. If any of them is 0, it can be determined that the element does not exist in the forward Bloom filter CBF1, and the group write count is not incremented. At $1^{st}$ second, taking the element to be queried (e.g., LBA ID3) as input, multiple hash values are calculated using the hash function of reverse Bloom filter CBF2. The bit array of reverse Bloom filter CBF2 is checked to determine whether the bits corresponding to the calculated hash value are all 1. If any of the bits is 0, it can be determined that the element does not exist in the reverse Bloom filter CBF2 and the group write count is not incremented.

In this way, after alternating queries of the forward Bloom filter CBF1 and the reverse Bloom filter CBF2, if all the bits of corresponding hash values in the forward Bloom filter CBF1 and the reverse Bloom filter CBF2 are 1, indicating that the element may exist in the double Bloom filter, the group write count of the first storage group corresponding to LBA ID3 is incremented.

The double Bloom filter can store massive group write counts of the first storage group and the second storage group to avoid consumption of memory system resources. The size relationship between the group write count and the first preset threshold facilitates the performance of wear leveling, thereby improving the lifetime and performance of the non-volatile memory.

In some implementations, in the process of querying two Bloom filters alternately, the previous Bloom filter can be cleared after each query so that the Bloom filter state is reset at the next query.

As shown in FIG. 10, the forward Bloom filter CBF1 is queried at the 0th second, with the element to be queried as input, and multiple hash values are calculated by using the hash function of the forward Bloom filter CBF1. The bit array of the forward Bloom filter CBF1 is checked to determine whether the bits corresponding to the calculated hash values are all 1. If any bit of them is 0, it can be determined that the element does not exist in forward Bloom filter CBF1. After the 0th second query ends, the bit array of the forward Bloom filter CBF1 is cleared and the status of the forward Bloom filter CBF1 is reset, so that it can be used in the next query.

The reverse Bloom filter CBF2 is queried at the 1st second, with the element to be queried as input, multiple hash values are calculated by using the hash function of the reverse Bloom filter CBF2, and the bit array of the reverse Bloom filter CBF2 is checked to determine whether the bits corresponding to the calculated hash value are all 1. If any bit is 0, it can be determined that the element does not exist in the reverse Bloom filter CBF2. After the 1st second query ends, the bit array of the reverse Bloom filter CBF2 is cleared and the status of the forward and reverse Bloom filter CBF2 is reset so that it can be used in the next query.

At the next time point, alternately querying the two Bloom filters and clearing the previously queried Bloom filter are continued to implement periodic query operations. In this way, through the above-mentioned alternating query and clear operations, the interference of previous query information on subsequent queries can be avoided, and the memory usage of the Bloom filter can also be reduced.

In this implementation of the present application, the memory system includes a storage class memory system (SCM), and the non-volatile memory includes a phase change memory.

In the existing storage hierarchy, there is a gap in storage speed and storage capacity between Dynamic Random Access Memory (DRAM) and non-volatile memory (such as NAND flash memory), which limits further improvement of calculation capabilities of the computer. To this end, a storage-level memory whose storage speed and storage capacity is between dynamic random access memory and non-volatile memory is proposed. As an example, the storage densities of DRAM, PCM, and NAND may be 1×, 1× to 4×, and 4×; the read latencies of DRAM, PCM, and NAND may be 50 nanoseconds, 50 to 100 nanoseconds, and 10 to 25 microseconds. It can be seen that the storage speed (read latency and write latency) and storage capacity (storage density) of PCM lend itself to lie between dynamic random access memory and non-volatile memory, acting as an intermediate memory.

At present, there are many types of storage media for storage-level memory. The mainstream examples include, e.g., phase change memory, resistive random access memory, magnetic random access memory, and carbon nanotube random access memory.

The memory system in the implementation of the present application divides each storage area in the non-volatile memory into a first area that supports physical addressing and a second area that does not support physical addressing. When performing wear leveling process, a first storage group having a first group write count is swapped with a second storage group having a second group write count to move the first storage group having the first group write count from the first area to the second area, thereby preventing the first storage group having the maximum group write count among the multiple first storage groups from being in the first area that supports physical access after the wear leveling process. The risk can be avoided that the first storage group having the maximum group write count among the multiple first storage groups will still be physically accessed after wear leveling. The wear leveling effect of non-volatile memories such as phase change memories can be effectively improved, malicious program attacks are resisted, and service life is increased.

According to a second aspect of the implementation of the present application, a method of operating a memory system is provided. The memory system includes, e.g., a non-volatile memory and a memory controller coupled to the non-volatile memory. The non-volatile memory includes a plurality of storage areas, each storage area includes a plurality of first storage groups located in a first area and a plurality of second storage groups located in a second area. The first area supports physical addressing, and the second area does not support physical addressing. The method of operating the memory system may include one or more of the following.

For instance, the method may include performing a wear leveling process by swapping a first storage group having a first group write count with a second storage group having a second group write count. The first group write count may be a maximum group write count among a plurality of group write counts corresponding to the plurality of first storage groups, and the second group write count may be a minimum group write count among a plurality of group write counts corresponding to the plurality of second storage group.

For example, the non-volatile memory may be divided into multiple storage areas, and each storage area may be then divided into multiple storage groups. The first memory group and the second memory group each include a second number of memory cells. The sizes of the first storage group and the second storage group are the same as the size of the code word, where the code word includes user data, ECC, and metadata. A code word may include multiple memory cells, and the number of memory cells included in a code word may be adjusted according to actual conditions.

In a specific implementation, the size of the ECC is 256 B, and the size of the code word is 4 KB. It can be understood that the sizes of the first storage group and the second storage group are also 4 KB. Taking the non-volatile memory 110 being the phase change memory as an example, the second number is $2^{12}$.

In some implementations, the ratio of the first number to the second number ranges from $2^4$ to $2^{12}$. For example, the ratio of the first number to the second number is $2^4$, $2^8$, or $2^{12}$.

In some implementations, the size of the first storage group and the second storage group may be the same as the size of the block. In an example, the size of a block is 512 KB (4 KB*$2^7$) or 1024 KB (4 KB*$2^8$), or even larger. It can be understood that the block may include multiple memory cells, and the number of memory cells included in the block may be adjusted according to actual conditions.

In a specific implementation, the size of the block is 1024 KB. It can be understood that the sizes of the first storage group and the second storage group are also 1024 KB. Taking the non-volatile memory 110 as an example of a phase change memory, the first number is $2^{20}$.

It should be noted that the first number and the second number in the above implementation are only an example. The storage area, the first storage group, and the second storage group may be divided into different sizes according to the actual size and type of the non-volatile memory.

It can be understood that the first storage group and the second storage group including a first number of memory cells have a first level of granularity, and the first storage group and the second storage group including a second number of memory cells have a second level of granularity. In the implementation of the present application, wear leveling process can be performed on the non-volatile memory at different granularity levels, which can greatly improve the flexibility and fitness of the wear leveling process on the non-volatile memory.

Figure 11:
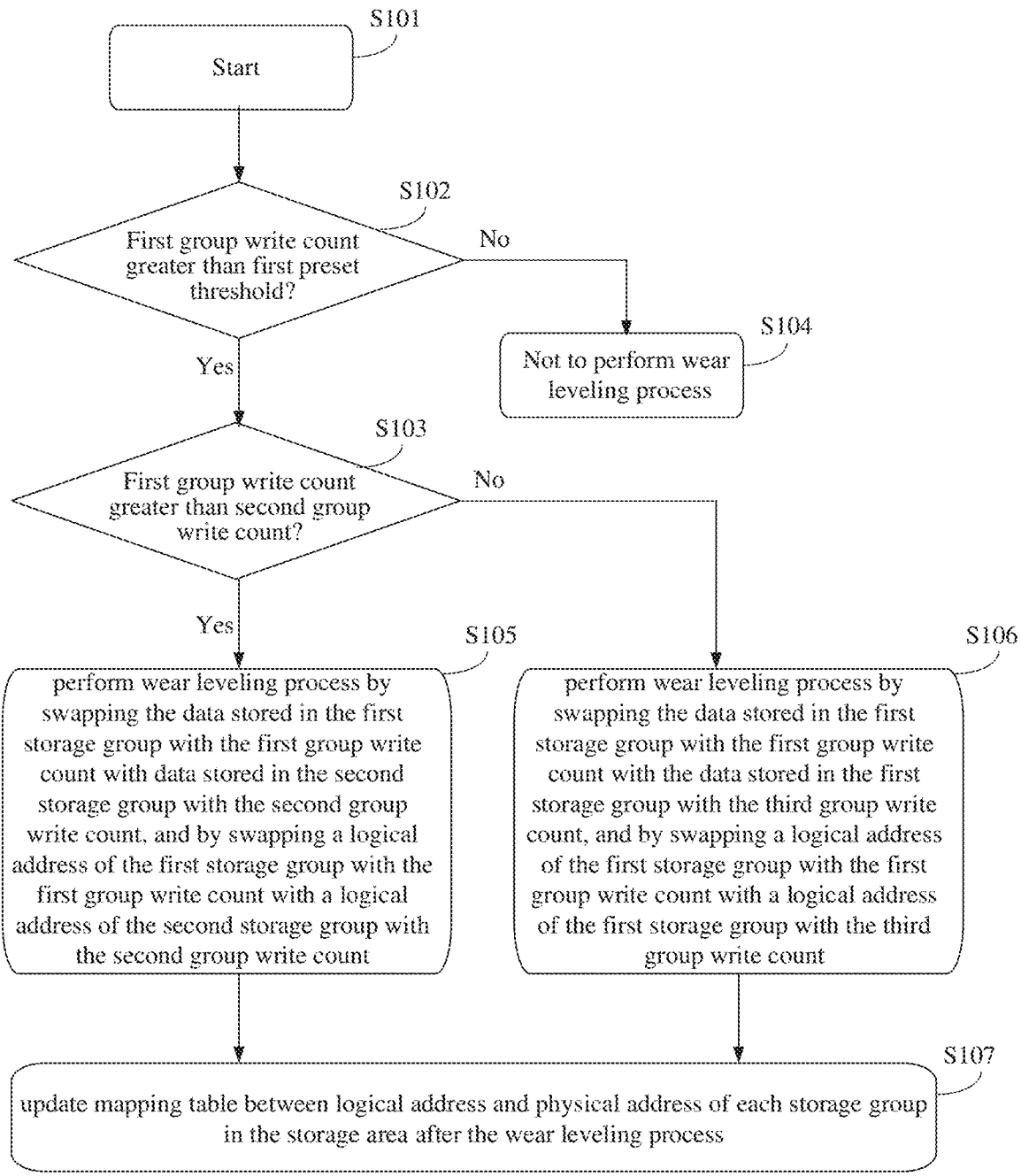
FIG. 11 is a flow chart of a method of operating of a memory system, according to an implementation of the present application.

FIG. 11 is a flow chart of a method of operating a memory system according to an implementation of the present application. The operations associated with the wear leveling process will be described in detail below with reference to FIGS. 3 to 9 and FIG. 11.

For example, as shown in FIG. 11, at operation S101, the memory controller obtains a first preset threshold, a plurality of group write counts of a plurality of first storage groups, and a plurality of group write counts of a second storage group.

At operation S102, the first group write count is compared to the first preset threshold to determine whether the first group write count is greater than the first preset threshold. The first group write count is the maximum value among the group write counts of all first storage groups.

If the first group write count is less than or equal to the first preset threshold, operation S104 is performed. In other words, the wear leveling process is not performed.

If the first group write count is greater than the first preset threshold, operation S103 is performed. At operation S103, the first group write count is compared to the second group write count, and the first group write count is the minimum value among the group write counts of all second storage groups. It is determined whether the first group write count is greater than the second group write count. Referring to FIG. 3 and FIG. 4, the group write count of the first storage group corresponding to the physical address 2 mapped by the logical address 2 is 6K, and the group write count of the first storage group is the maximum value of the group write counts of all first storage groups. That is, the first group write count is 6K. The group write count of the second storage group corresponding to the physical address M mapped by the logical address M is 5K, and the group write count of the second storage group is the minimum value of the group write counts of all second storage groups. That is, the second group write count is 5K.

When the first group write count is greater than the second group write count, operation S105 is performed. At operation S105, the wear leveling process is performed by swapping the data stored in the first storage group having the first group write count with data stored in the second storage group having the second group write count, and by swapping logical address of the first storage group having the first group write count with logical address of the second storage group having the second group write count.

Referring to FIGS. 5 and 6, wear leveling is performed by swapping the data stored in the first storage group corresponding to the physical address 2 mapped by the logical address 2 with the data stored in the second storage group corresponding to the physical address M mapped by the logical address M, and by swapping the logical address of the first storage group corresponding to physical address 2 with the logical address of the second storage group corresponding to physical address M.

As shown in FIGS. 5 and 6, after wear leveling process, physical address 2 corresponds to logical address M, and physical address M corresponds to logical address 2. Since the first storage group having the first group write count is swapped to the second area that does not support physical access, the first storage group having the first group write count will not be physically accessed on subsequent writes. It can be understood that the memory system in the implementations of the present application can resist malicious attacks when performing wear leveling.

When the first group write count is less than or equal to the second group write count, operation S106 is performed. At operation S106, wear leveling is performed by swapping the data stored in the first storage group having the first group write count with the data stored in the first storage group having the third group write count, and by swapping the logical address of the first storage group having the first group write count with the logical address of the first storage group having the third group write count.

Referring to FIGS. 4 and 7, the group write count of the first storage group corresponding to the physical address 2 mapped by the logical address 2 is 4K, and the group write count of the first storage group is the maximum value of the group write counts of all first storage groups. That is, the first group write count is 4K. The group write count of the second storage group corresponding to the physical address M mapped by the logical address M is 5K, and the group write count of the second storage group is the minimum value of the group write counts of all second storage groups. That is, the second group write count is 5K. The first group write count is less than the second group write count.

The group write count of the first storage group corresponding to the physical address 7 mapped by the logical address 7 is 6, and the group write count of the first storage group is the minimum value of the group write counts of all first storage groups. That is, the third group write count is 6.

Referring to FIGS. 8 and 9, wear leveling process is performed by swapping the data stored in the first storage group corresponding to the physical address 2 mapped by the logical address 2 with the data stored in the first storage group corresponding to the physical address 7 mapped by the logical address 7, and by swapping the logical address of the first storage group corresponding to physical address 2 with the logical address of the second storage group corresponding to physical address 7.

As shown in FIG. 8 and FIG. 9, after wear leveling process, physical address 2 corresponds to logical address 7, and physical address 7 corresponds to logical address 2. Since the first group write count is less than the second group write count, the first storage group having the first group write count can still withstand a certain number of write operations. Therefore, the first storage group having the maximum group write count is swapped with the first storage group having the minimum group write count in the first area so as to perform wear leveling process, which can achieve the effect of balancing the degree of wear of multiple first storage groups.

After operation S105 or operation S106, operation S107 may be performed. That is, the mapping table between the logical address and the physical address of each storage group in the storage area is updated after the wear leveling process.

In some implementations, when both the first storage group and the second storage group include a first number of memory cells, the mapping table between logical addresses and physical addresses of each storage group of the storage area is updated after the wear leveling process, and is stored into the volatile memory of the memory controller 120. As an example, when both the first memory group and the second memory group include a first number of memory cells, the mapping tables shown in FIGS. 4 and 6 are stored in the volatile memory of the memory controller 120.

In other implementations, when both the first storage group and the second storage group include the second number of memory cells, the mapping table between the logical address and the physical address of each storage group of the storage area is updated after the wear leveling process, and is stored into the non-volatile memory 110. As an example, when both the first storage group and the second storage group include a second number of memory cells, the mapping tables shown in FIGS. 4 and 6 are stored in the metadata of the non-volatile memory 110 of the memory controller 120.

Figure 12:
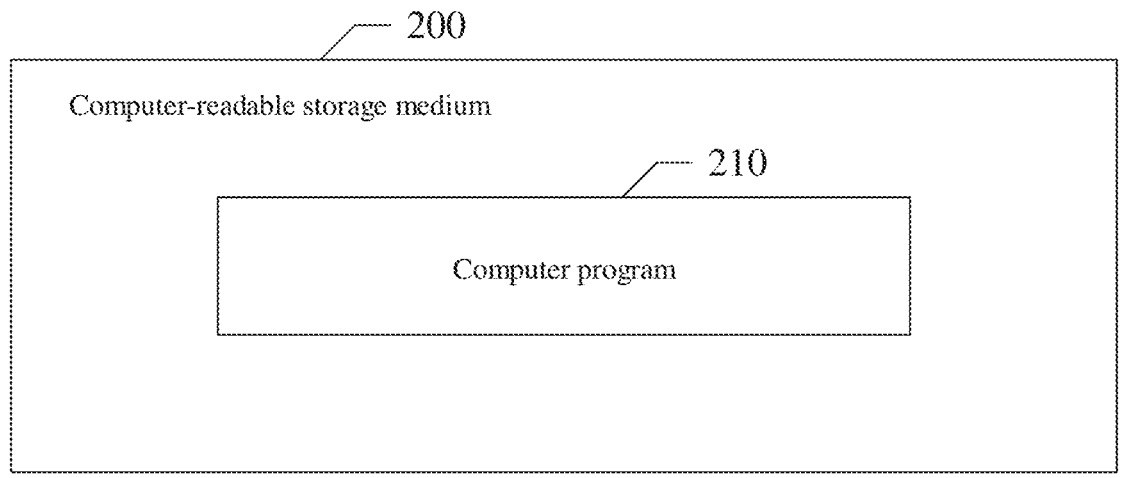
FIG. 12 is a block diagram of a computer-readable storage medium, according to an implementation of the present application.

Referring to FIG. 12, a block diagram of a computer-readable storage medium according to an implementation of the present application is shown. As shown in FIG. 12, the implementation of the present application provides a readable storage medium. The computer-readable storage medium 200 stores a computer program 210. When the computer program 210 is executed by a processor, the method of operating the memory system in the above technical solution can be implemented. For instance, the method of operating may include, e.g., performing a wear leveling process by swapping a first storage group having a first group write count with a second storage group having a second group write count. The first group write count is a maximum group write count among a plurality of group write counts corresponding to the plurality of first storage groups, and the second group write count is a minimum group write count among a plurality of group write counts corresponding to a plurality of second storage group.

Figure 13:
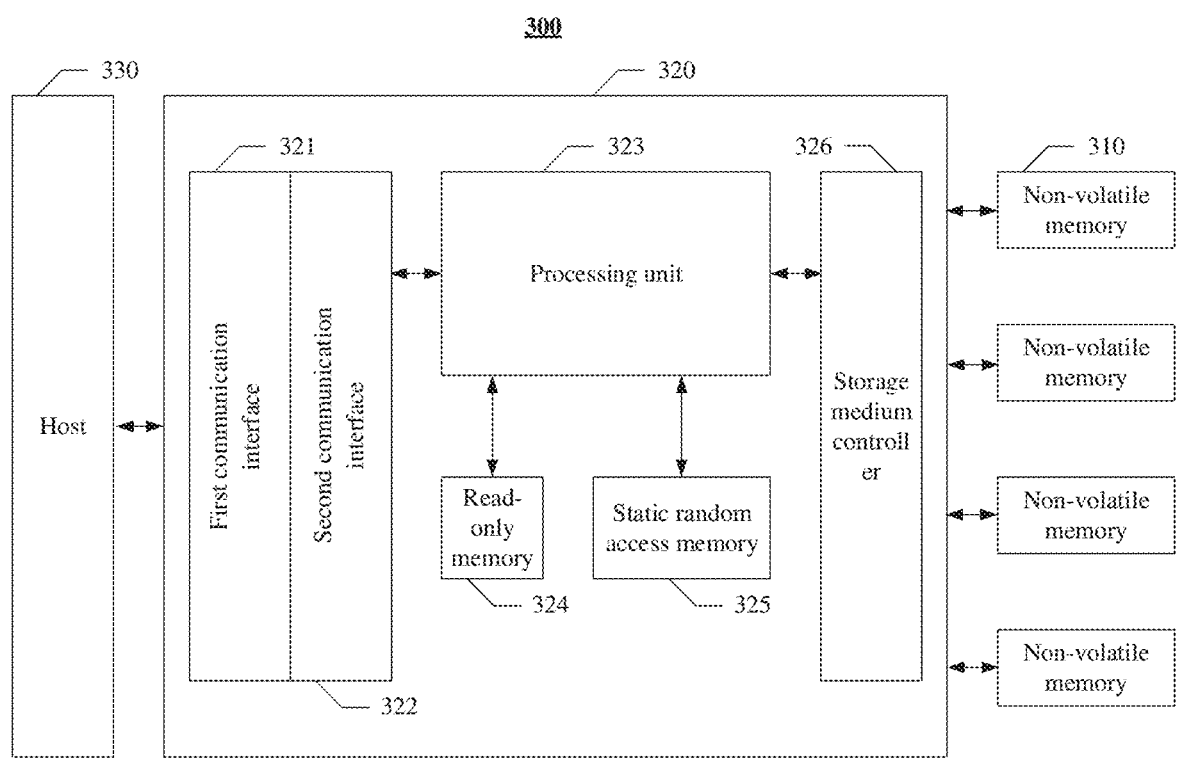
FIG. 13 is a block diagram of a system, according to an implementation of the present application.

Referring to FIG. 13, which is a block diagram of a system according to an implementation of the present application, the system 300 may be a mobile phone, desktop computer, laptop computer, tablet computer, vehicle computer, or any other suitable electronic device having non-volatile memory 310 (e.g., PCM) therein, as shown in FIG. 13.

As shown in FIG. 13, system 300 may include a host 330 and a memory system, and the memory system may include a memory controller 320 and at least one non-volatile memory 310. The host 330 may be a processor (e.g., Central Processing Unit (CPU)) or a system on chip (SoC) (e.g., Application Processor (AP)) of the electronic device. Host 330 may be configured to send data to or receive data from non-volatile memory 310. FIG. 13 illustrates the connection between the memory controller 320 and four non-volatile memories 310. In fact, the implementation of the present application does not place a special limit on the number of non-volatile memories 310 connected to the memory controller 320. The number of non-volatile memories 310 connected to the memory controller 320 may be less than 4 (e.g., 1). Alternatively, the number of the non-volatile memories 310 connected to the memory controller 320 may be greater than 4 (e.g., 5).

In some implementations, the memory controller 320 may interact with the host 330 and non-volatile memory 310, respectively, and be configured to control the non-volatile memory 310. The memory controller 320 may manage data stored in non-volatile memory 310 and communicate with host 330.

In an example, the memory system may include at least one non-volatile memory 310 and a memory controller 320 coupled to the non-volatile memory 310. The memory system may include storage-level memory, and the non-volatile memory 310 may include a phase change memory.

Still referring to FIG. 13, the memory controller 320 includes a first communication interface 321, a second communication interface 322, a processing unit 323, a read-only memory (ROM) 324, and a static random access memory 325 and storage medium controller 326. The processing unit 323 and the host 330 are communicatively connected via a first communication interface 321 and a second communication interface 322. The processing unit 323 may also be connected to the storage medium controller 326 for controlling the storage medium controller 326, and the storage medium controller 326 may be connected to the non-volatile memory 310 for controlling the non-volatile memory 310. The processing unit 323 can also be connected to the read-only memory 324 and the static random access memory 325. The processing unit 323 may obtain data from the read-only memory 324, and the processing unit 323 can store part of the temporary data in the static random access memory 325.

In some implementations, the first communication interface 321 may be Peripheral Component Interconnect Express (PCIE). That is, the first communication interface may be an interface set according to the High Speed Serial Computer Extension Bus standard, and the second communication interface 322 may be a Compute Express Link (CXL).

It will be understood that reference throughout this specification to "one implementation" or "an implementation" means that a particular feature, structure, or characteristic associated with the implementation is included in at least one implementation of the present application. Thus, the appearances of "in one implementation" or "in an implementation" in various places throughout this specification are not necessarily referring to the same implementation. Furthermore, the particular features, structures or characteristics may be incorporated in any suitable manner into one or more implementations. It should be understood that in the various implementations of the present application, the sequence numbers of the above-mentioned processes do not mean the order of execution. The execution order of each process should be determined by its functions and internal logic, and should not constitute any limitation on the implementation process of the present application. The above serial numbers of the implementations of the present application are only for description and do not represent the advantages or disadvantages of the implementations.

The above are only the preferred implementations of the present application, and do not limit the patent scope of the present application. Under the inventive concept of the present application, equivalent structural transformations made by using the contents of the description and drawings of the present application, or direct/indirect application in other related technical fields are included in the patent protection scope of this application.

The implementation of the present application divides each storage area in the non-volatile memory into a first area that supports physical addressing and a second area that does not support physical addressing. When performing a wear leveling process, a first storage group having a first group write count is swapped with a second storage group having a second group write count to move the first storage group having the first group write count from the first area to the second area, thereby preventing the first storage group having the maximum group write count among the multiple first storage groups from still residing in the first area that supports physical access after the wear leveling process. The risk can be avoided that the first storage group having the maximum group write count among the multiple first storage groups is still physically accessed after wear leveling process.

What is claimed is:

1. A memory system, comprising:
 a non-volatile memory, comprising:
  a plurality of storage areas, each of the storage areas comprising:
   a plurality of first storage groups located in a first area; and
   a plurality of second storage groups located in a second area, the first area supporting physical addressing, and the second area not supporting physical addressing; and
 a memory controller coupled to the non-volatile memory and configured to:
  perform a wear leveling process by swapping a first storage group having a first group write count with a second storage group having a second group write count, wherein the first group write count is a maximum group write count among a plurality of group write counts corresponding to the plurality of first storage groups, and wherein the second group write count is a minimum group write count among a plurality of group write counts corresponding to the plurality of second storage groups.

2. The memory system of claim 1, wherein the memory controller is configured to:

compare the first group write count to the second group write count; and when the first group write count is greater than the second group write count, perform wear leveling process by swapping the first storage group having the first group write count with a second storage group having the second group write count.

3. The memory system of claim 2, wherein the memory controller is further configured to:

when the first group write count is less than or equal to the second group write count, perform wear leveling process by swapping the first storage group having the first group write count with the first storage group having a third group write count, the third group write count being a minimum group write count among the plurality of group write counts corresponding to the plurality of first storage groups.

4. The memory system of claim 3, wherein the memory controller is further configured to:

perform the wear leveling process by swapping data stored in the first storage group having the first group write count with data stored in the second storage group having the second group write count, and by swapping a logical address of the first storage group having the first group write count with a logical address of the second storage group having the second group write count; or perform the wear leveling process by swapping the data stored in the first storage group having the first group write count and data stored in the first storage group having the third group write count, and by swapping a logical address of the first storage group having the first group write count with a logical address of the first storage group having the third group write count.

5. The memory system of claim 3, wherein the memory controller is configured to:

before comparing the first group write count to the second group write count, compare the first group write count to a first preset threshold; and when the first group write count is greater than the first preset threshold, compare the first group write count to the second group write count.

6. The memory system of claim 5, wherein the first preset threshold increases as an electrical distance between the first storage group corresponding to the first group write count and a voltage source increase.

7. The memory system of claim 4, wherein:

the first storage group and the second storage group each comprise a first number of memory cells, and the memory controller is configured to:

update a mapping table between a logical address and a physical address of each storage group of a storage area after the wear leveling process, and store the mapping table into a volatile memory of the memory controller, or the first storage group and the second storage group each comprise a second number of memory cells less than the first number of memory cells, and the memory controller is configured to:

update the mapping table between a logic address and a physical address of each storage group of the storage area after the wear leveling process, and store the mapping table into the non-volatile memory.

8. The memory system of claim 7, wherein the group write count is obtained by counting using a double Bloom filter.

9. The memory system of claim 1, further comprising:

a storage-class memory system, wherein the non-volatile memory comprises a phase change memory.

10. A method of operating a memory system, comprising:

performing, by a memory controller coupled to a non-volatile memory, a wear leveling process by swapping a first storage group having a first group write count with a second storage group having a second group write count, the non-volatile memory including a storage area, wherein the first storage group is included in a plurality of first storage groups located in a first area of the non-volatile memory and the second group is included in a plurality of second storage groups in a second area of the non-volatile memory, wherein the first area supports physical addressing, and the second area does not support physical addressing, wherein the first group write count is a maximum group write count among a plurality of group write counts corresponding to the plurality of first storage groups, and wherein the second group write count is a minimum group write count among a plurality of group write counts corresponding to the plurality of second storage groups.

11. The method of claim 10, further comprising:

comparing, by the memory controller, the first group write count to the second group write count; and when the first group write count is greater than the second group write count, performing, by the memory controller, wear leveling process by swapping the first storage group having the first group write count with a second storage group having the second group write count.

12. The method of claim 11, further comprising:

when the first group write count is less than or equal to the second group write count, performing, by the memory controller, the wear leveling process by swapping the first storage group having the first group write count with the first storage group having a third group write count, wherein the third group write count is a minimum group write count among the plurality of group write counts corresponding to the plurality of first storage groups.

13. The method of claim 12, further comprising:

performing, by the memory controller, the wear leveling process by swapping data stored in the first storage group having the first group write count with data stored in the second storage group having the second group write count, and by swapping a logical address of the first storage group having the first group write count with a logical address of the second storage group having the second group write count; or performing, by the memory controller, the wear leveling process by swapping the data stored in the first storage group having the first group write count and data stored in the first storage group having the third group write count, and by swapping a logical address of the first storage group having the first group write count with a logical address of the first storage group having the third group write count.

14. The method of claim 12, further comprising:
before comparing the first group write count to the second group write count, comparing, by the memory controller, the first group write count to a first preset threshold; and
when the first group write count is greater than the first preset threshold, comparing, by the memory controller, the first group write count to the second group write count.

15. The method of claim 13, wherein:
the first storage group and the second storage group each comprise a first number of memory cells or a second number of memory cells less than the first number, and
the method further comprises:
updating, by the memory controller, a mapping table between a logical address and a physical address of each storage group of the storage area after the wear leveling process, and storing, by the memory controller, the mapping table into a volatile memory of the memory controller; or
updating, by the memory controller, the mapping table between a logic address and a physical address of each storage group of the storage area after the wear leveling process, and storing, by the memory controller, the mapping table into the non-volatile memory.

16. A non-transitory computer-readable storage medium storing instructions, which when executed by a processor, cause the processor to:
perform a wear leveling process by swapping a first storage group having a first group write count with a second storage group having a second group write count, the first storage group and the second storage group being associated with a non-volatile memory,
wherein the first storage group is included in a plurality of first storage groups located in a first area of the non-volatile memory and the second group is included in a plurality of storage groups in a second area of the non-volatile memory,
wherein the first area supports physical addressing, and the second area does not support physical addressing,
wherein the first group write count is a maximum group write count among a plurality of group write counts corresponding to the plurality of first storage groups, and
wherein the second group write count is a minimum group write count among a plurality of group write counts corresponding to the plurality of second storage groups.

17. The non-transitory computer-readable storage medium of claim 16, wherein the instructions, which when executed by the processor, further cause the processor to:
compare the first group write count to the second group write count; and
when the first group write count is greater than the second group write count, perform the wear leveling process by swapping the first storage group having the first group write count with a second storage group having the second group write count.

18. The non-transitory computer-readable storage medium of claim 17, wherein the instructions, which when executed by the processor, further cause the processor to:
when the first group write count is less than or equal to the second group write count, perform wear leveling process by swapping the first storage group having the first group write count with the first storage group having a third group write count,
wherein the third group write count is a minimum group write count among the plurality of group write counts corresponding to the plurality of first storage groups.

19. The non-transitory computer-readable storage medium of claim 18, wherein the instructions, which when executed by the processor, further cause the processor to:
perform the wear leveling process by swapping data stored in the first storage group having the first group write count with data stored in the second storage group having the second group write count, and by swapping a logical address of the first storage group having the first group write count with a logical address of the second storage group having the second group write count; or
perform the wear leveling process by swap the data stored in the first storage group having the first group write count and data stored in the first storage group having the third group write count, and by swapping a logical address of the first storage group having the first group write count with a logical address of the first storage group having the third group write count.

20. The non-transitory computer-readable storage medium of claim 18, wherein the instructions, which when executed by the processor, further cause the processor to:
before comparing the first group write count to the second group write count, compare the first group write count to a first preset threshold; and
when the first group write count is greater than the first preset threshold, compare the first group write count to the second group write count.

* * * * *